F. HORNBY.
BELT FASTENER.
APPLICATION FILED APR. 29, 1912.
1,065,943.
Patented July 1, 1913.
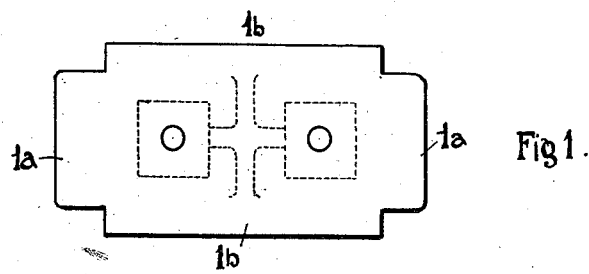
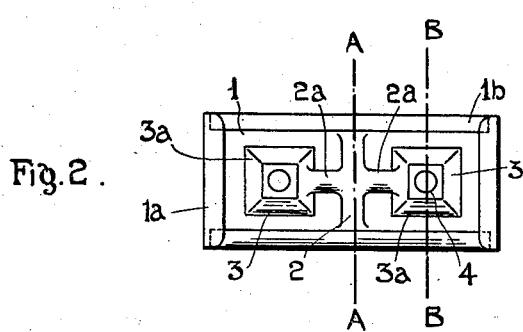 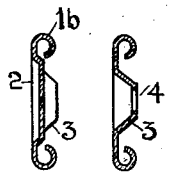
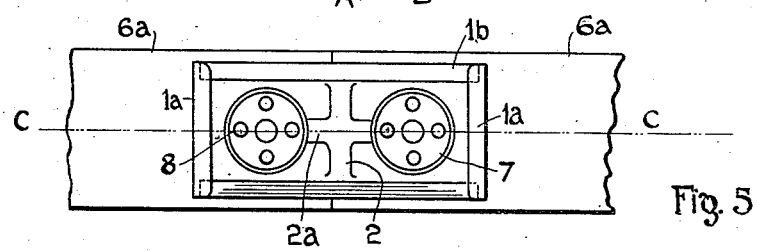
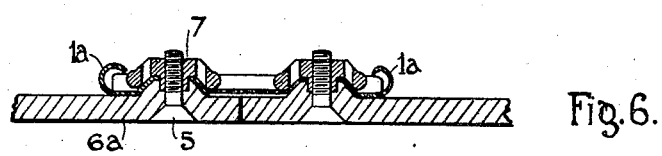
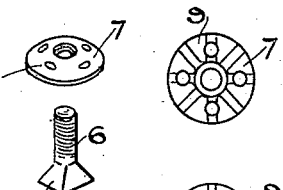
Witnesses:
D. W. Putnam
L. E. Darkley
Inventor:
Frank Hornby
by Franks Ableman

UNITED STATES PATENT OFFICE.

FRANK HORNBY, OF LIVERPOOL, ENGLAND.

BELT-FASTENER.

1,065,943.  Specification of Letters Patent.  Patented July 1, 1913.

Application filed April 29, 1912. Serial No. 693,861.

*To all whom it may concern:*

Be it known that I, FRANK HORNBY, a subject of the King of Great Britain, and a resident of Liverpool, England, have invented certain new and useful Improvements in or Relating to Belt-Fasteners, of which the following is a specification.

This invention relates to improvements in that type of belt fastener for making butt joints on driving belts in which the abutting ends of the belt are gripped, within recesses formed in the connecting plate, by means of cup headed bolts and nuts. In such types of belt fastener the ends of the connecting plate have been rounded, and it is found that these rounded ends tend to tear or cut into the belt in the region of the curved edges of the plate.

One of the objects of the present invention is to avoid such tearing of the belt during wear. Again, the cup heads of the bolts in previous types have been furnished with prongs adapted to embed themselves in the belt (and thus avoid turning of the bolt while the nut is being tightened up;) such prongs, however, are apt to tear the material of the belt and consequently weaken it, while the operation of producing such a pronged cup head on the connecting bolts is expensive.

The present invention is directed to providing a type of bolt head which, while effectively obviating the turning of the bolt when screwing up the nut, shall be so formed as to avoid damaging the belt when in use.

The invention is illustrated in the accompanying drawings, in which,

Figure 1. is a plan view of the blank or stamping from which the plate of the belt fastener is formed. Fig. 2. is a plan view of the plate showing the sides and edges curled up and the recesses embossed for the bolt heads. Fig 3. is a cross section on the line A—A of Fig. 2., and Fig. 4. is a cross section on the line B—B. Fig. 5. is a plan view of a belt fastener in position coupling the ends of a belt, Fig. 6. being a longitudinal vertical section on the line C—C of Fig. 5. Fig. 7. is a perspective view of the bolt and nut for gripping the fastener to the belt. Fig. 8. is a plan view of the underneath face of the nut showing the radial locking notches, Fig. 9. showing a modified arrangement of the notches.

According to this invention the plate 1 of the fastener is struck up from a sheet metal blank as shown in Fig. 1., the dotted lines in Fig. 1., showing where the blank is subsequently embossed. The ends 1$^a$ and sides 1$^b$ of this blank are then curled up as shown in Fig. 2. thus providing straight transverse ends 1$^a$ across the extremities of the plate, instead of such ends being curved when looked at in plan as in the more usual type of belt fastener. The ends 1$^a$ of the plate are well turned over during this operation of forming the plate as shown in Fig. 6. so that these edges are straight and approximately cylindrical and are consequently very lenient to the belt in wear and do not tear into the leather or material. The longitudinal sides 1$^b$ of the plate are also well turned over as shown, thus giving longitudinal rigidity to the plate, and a central transverse rib 2 may be embossed in the metal of the fastener plate to act in conjunction with the end curls 1$^a$ to give transverse rigidity. Recesses 3 are stamped up in the plate, these recesses being embossed in a preferably four sided pyramidal form and are pierced centrally at 4 to receive the bolt shank. The head 5 of the bolt 6 shown in Fig. 7. is correspondingly shaped pyramidally to socket itself within the depression of the belt 6$^a$ as the latter is pressed into the embossed recess 3 in the plate by screwing up the nuts 7. By such a construction the abutting ends of the belt are compressed into the pyramidal recesses of the plate and held very securely therein, while the pyramidal construction effectually prevents the bolt turning as the nut is being tightened up. The transverse ribs 2 may be further joined by longitudinal shorter ribs 2$^a$ to the recesses 3 thus producing an exceedingly strong form of plate. The nuts 7 are provided with the usual podger holes 8 for tightening up, and in the under face of the nut are cut a series of radial grooves or notches 9 to form ridges. These notches may extend some distance across the under face of the nut as shown in Fig. 8., or as in the form shown in Fig. 9. be cut in the outer rim, only 7$^a$ of the nut, this rim being formed on the under face. These notches are adapted when the nut is being tightened up to engage with the corners 3$^a$ of the embossed recesses of the plate, and spring over the corners as the nut is being tightened up, thus acting to lock the nut against unscrewing. Any number of such locking notches may be fitted in the under surface of the nuts. Such a construction of belt fastener is very economical to manufacture, as it may be readily stamped up from sheet metal, and by reason of the curled ends, transverse rib, and longitudinal side curlings, the plate acquires a very considerable rigidity.

I claim:

1. In a belt fastener, a rectangular plate, the ends and sides of said plate extending upwardly and adapted to be bent downwardly to engage the upper edge of the plate, pyramidal embossed portions in the plate, bolts having pyramidal heads corresponding in shape to the pyramidal embossed portions, and adapted to grip the belt therein, nuts for the bolts, and radial ridges on the underfaces of the nuts adapted to coöperate with the edges of the pyramidal embossed parts to lock the nuts.

2. In a belt fastener, a plate, rectangular curled ends and sides on the plate, pyramidal embossed parts therein, transverse and longitudinal ribs in the plate, pyramidal headed bolts corresponding in shape to the pyramidal embossed parts and adapted to grip the belt therein, nuts for the bolts, and radial ridges on the underfaces of the nuts adapted to coöperate with the edges of the pyramidal parts to lock the nuts.

In testimony whereof I affix my signature in presence of two witnesses.

FRANK HORNBY.

Witnesses:
W. J. DAVIES,
B. KNIGHT.

Copies of this patent may be obtained for five cents each, by addressing the "Commissioner of Patents, Washington, D. C."